United States Patent [19]

Drake et al.

[11] 3,783,392

[45] Jan. 1, 1974

[54] LONG PERIOD INTEGRATOR

[75] Inventors: Daniel D. Drake, Riverdale; Evan E. M. Lloyd, Columbia; Richard F. Norris, Rockville, all of Md.

[73] Assignee: The Singer Company, Binghamton, N.Y.

[22] Filed: Apr. 7, 1972

[21] Appl. No.: 242,165

[52] U.S. Cl. .................. 328/127, 307/235, 307/229, 328/128

[51] Int. Cl. .................. G06g 7/18

[58] Field of Search .................. 328/127, 128; 235/197, 250.1; 307/235, 229

[56] References Cited

UNITED STATES PATENTS 3,550,108 12/1970 James et al. .................. 328/127

*Primary Examiner*—John W. Huckert
*Assistant Examiner*—B. P. Davis
*Attorney*—Francis L. Masselle et al.

[57] ABSTRACT

The device of this invention is an integrator which can operate properly in a wide variety of situations, and particularly in those situations where the input to the integrator may be relatively constant for long periods of time. The integrator of this invention provides means for separating the incoming signals into a magnitude indication and a polarity indication. The magnitude indication is used to control the frequency of a voltage controlled oscillator whose output is supplied to the input of a reversible counter. The polarity indication is used to determine the direction in which the counter counts. The contents of the counter at any instant is converted into an analog quantity by a digital-to-analog converter.

2 Claims, 1 Drawing Figure

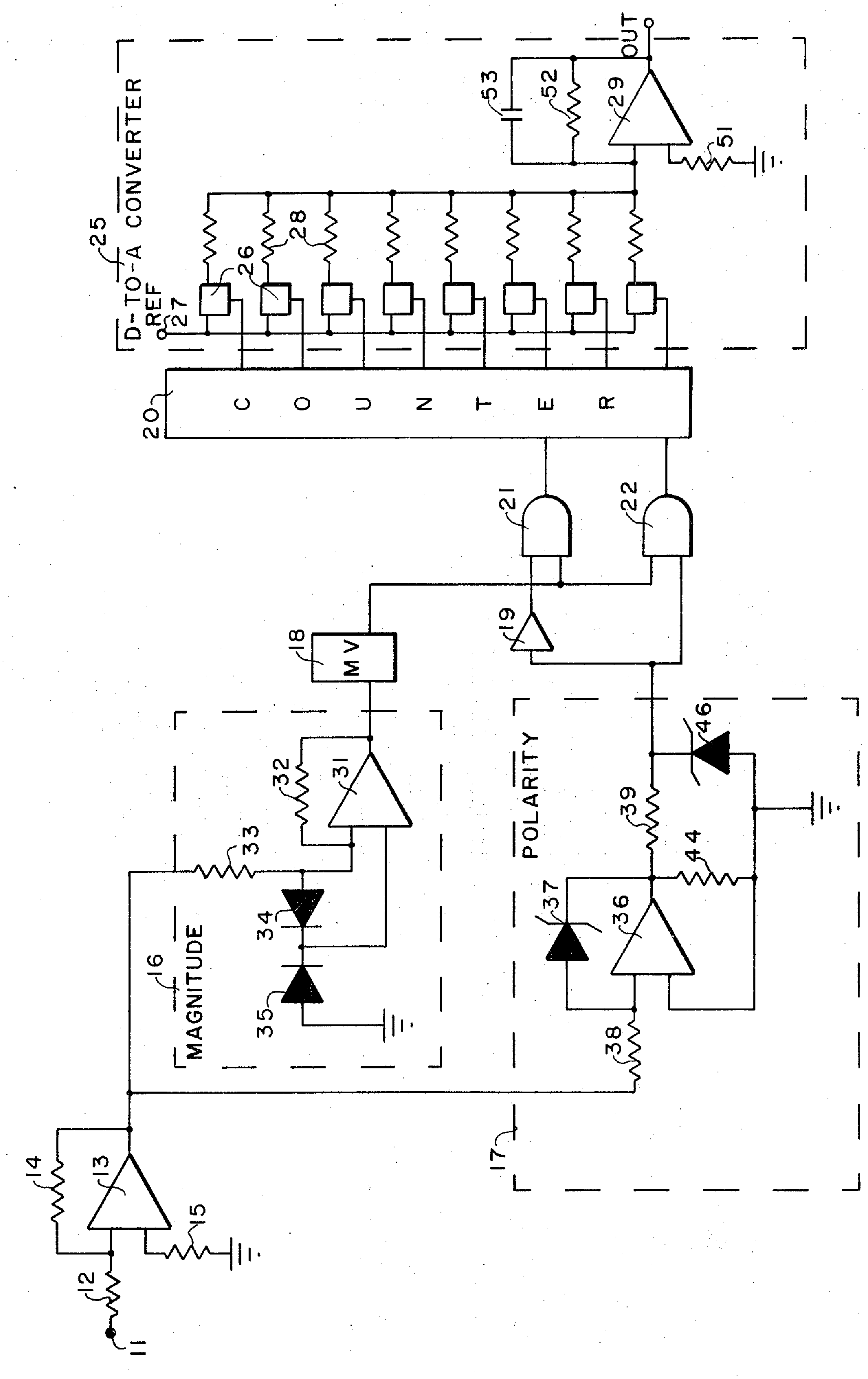
D-TO-A CONVERTER
REF
OUT
COUNTER
MV
MAGNITUDE
POLARITY
11
12
13
14
15
16
17
18
19
20
21
22
25
26
27
28
29
31
32
33
34
35
36
37
38
39
44
46
51
52
53

LONG PERIOD INTEGRATOR

BACKGROUND OF THE INVENTION

1. Field of the Invention

This invention relates to electronic devices, and more particularly to devices for producing the integral of a varying signal.

2. Description of the Prior Art

Electronic integrating devices are not new, but those which have been used in the past have suffered from many disadvantages. One of the earliest forms of electrical integrating devices is a capacitor which is usually connected in series with a load resistor. The capacitor tends to accumulate changes in the input signals and to store the sum result of those changes in a voltage which is proportional to the difference between the rate of input change and the rate of capacitor leakage. Subsequently, many types of integrators have been developed, including operational amplifiers which include capacitors in their feedback paths. Sample-and-hold circuits periodically sample a slowly varying voltage and store the value of the integral of that voltage for substantial intervals of time. However, in all of these devices, there is a tendency to drift when the input is virtually unchanging for long intervals of time.

SUMMARY OF THE INVENTION

Apparatus for integrating an electrical voltage, said apparatus comprising a counter, an oscillator whose frequency is controlled by the amplitude of an electrical signal, means for connecting the output of said oscillator to the input of said counter, means for converting the output of said counter into an electrical potential, means connected to said oscillator for generating an electrical signal whose amplitude is proportional to the amplitude of the voltage to be integrated, and means responsive to the polarity of the voltage to be integrated for determining when the output of said oscillator is added to the contents of said counter and when the output of said oscillator is subtracted from the contents of said counter.

It is an object of this invention to provide a new and improved electronic device.

It is another object of this invention to provide a new and improved electronic integrating circuit.

It is a further object of this invention to provide a new and improved electronic integrating circuit which will maintain an accurate output value for long intervals of time.

It still another object of this invention to provide a new and improved electronic integrating device which converts a slowly changing analog signal to a digital signal and which changes the digital signal to an analog signal.

Other objects and advantages of this invention will become apparent as the following description proceeds, which description should be considered together with the single FIGURE of the drawing.

BRIEF DESCRIPTION OF THE DRAWING

The single FIGURE of the drawing of this application is a combined logical block diagram and a schematic circuit diagram of the integrator of this invention.

DESCRIPTION OF THE PREFERRED EMBODIMENT

Referring now to the drawing in detail, the reference character 11 designates an input terminal to which a slowly varying direct signal is applied. Terminal 11 is connected through a resistor 12 to one input of an operational amplifier 13 whose other input is connected to ground through a resistor 15. The feedback path for the amplifier 13 includes a feedback resistor 14. The output of the amplifier 13 is connected through a resistor 33 to one input of another operational amplifier 31 which has a resistor 32 connected in its feedback path. A diode 34 is connected across the two inputs to the amplifier 31, and the second input to the amplifier 31 is connected through a diode 35 to ground. The amplifier 31 and its associated circuitry comprises an absolute amplitude device 16. The output from the amplitier 13 is also connected to the input of a polarity device 17 which comprises another operational amplifier 36. A zener diode 37 is connected in the feedback path of the amplifier 36. The first input to the amplifier 36 is connected through a resistor 38 to the output of the amplifier 13. The second input to the amplifier 36 is directly connected to ground. The output of the amplifier 36 is connected to ground through a resistor 44 and to the output of the polarity circuit through a resistor 39. A zener diode 36 is connected between the output of the polarity circuit 17 and ground, and the output of the polarity circuit 17 is connected directly to one input of an AND gate 22 and through an inverter 19 to one input of a second AND gate 21. The output of the magnitude circuit 16 is connected to the input of a voltage controlled oscillator 18 such as a multivibrator, and the output of the multivibrator 18 is directly connected to the other inputs of gates 21 and 22. The outputs of the gates 21 and 22 are connected to the inputs of a reversible counter 25. The output of the gate 21 is connected to the downcounting input, and the output of the gate 22 is connected to the up-counting input of the counter 25. The outputs from the counter 25 are individually connected to control a plurality of parallel electronic switches 26. One side of each of the switches 26 are connected together and to a terminal 27 for connection to a source of fixed reference potential. The other side of each of the switches 26 is connected to one side of a resistor 28, the other sides of which are all connected together. The switches 26 and the resistors 28 together form a standard digital-to-analog ladder. The output from the ladder is taken from that side of the resistors 28 which are connected together, and it is applied to one input of an operational amplifier 29. The other side of the amplifier 29 is connected to ground through a resistor 51, and a resistor 52 is connected to the feedback path of the amplifier 29. The output of the amplifier 29 serves as the output of the system.

The signal which is to be integrated is applied to the input of the operational amplifier 13 which serves to couple that signal to both the magnitude circuit 16 and the polarity circuit 17. The output of the magnitude circuit 16 is directly proportional to the absolute value of the input signal applied to the terminal 11 without regard to the polarity of that signal. The output of the magnitude circuit 16, therefore, is always in the same polarity. This signal is applied to the input of the voltage controlled oscillator 18. The oscillator 18 may be a multivibrator or a similar oscillator whose frequency can be controlled within a range of frequencies by the value of a voltage applied to it. Thus, the voltage output from the magnitude circuit 16 determines the frequency of the oscillator 18. The output from the operational amplifier 13 is also applied to the input of the polarity circuit 17. The output of the polarity circuit 17 has either of two values depending upon the polarity of its input signal. If the output of the polarity circuit 17 is positive, then a positive signal is applied to the other input of the gate 22. The positive output of the polarity circuit 17 is inverted by the inverter 19, and a negative signal is applied to the other input to the gate 21. This means that the gate 22 opens to permit the pulses from the multivibrator 18 to be applied to the upward counting input of the counter 25. The counter 25 counts upwardly at a rate which is determined by the frequency output of the multivibrator 18 and in a direction which is determined by which of the two gates 21 and 22 is opened. As the count output of the counter 25 changes, different individual switches 26 are closed. When a switch 26 closes, it connects the reference potential applied to input terminal 27 to the input of the amplifier 29 through the resistor 28 with which it is associated. Thus, as the count output of the counter 21 changes, those resistors 28 which are connected in parallel between the terminal 27 and the amplifier 29 are varied. The individual resistors 28 vary in value in accordance with a preselected function. The resistors 28 could, for example, be related to each other in a binary fashion. In this way, the voltage applied to the input of amplifier 29 could directly represent the count contained in the counter 25. A resistor 52 and a parallel connected capacitor 53 are connected in the feedback path of the amplifier 29 to provide a voltage at the output terminal 54 which is smooth and which represents an integral of the voltage applied to the terminal 11.

As indicated above, the magnitude circuit 16 provides an output voltage which is directly proportional to the input voltage in magnitude but not in polarity. When a negative voltage appears at the output of the amplifier 13, that voltage is applied to the negative input of the amplifier 31 and appears as a positive output voltage at the input of the multivibrator 13. When a same voltage value which is positive appears at the output of the amplifier 13, it is applied through ground to the positive input of the amplifier 31 and it is also applied as a positive signal in the input of the multivibrator 18. The reversely connected diodes 34 and 35 ensure that only the signal of the proper polarity will appear at the proper input of the amplifier 31. Thus, regardless of the polarity of the signal to the input terminal 11, the output from the amplifier 31 is always positive.

The polarity circuit 17 provides the inputs to the two gates 21 and 22 with a signal which represents the polarity of the input terminal 11. A negative signal applied through resistor 38 to the inverting input of amplifier 36 tends to drive the output of amplifier 36 positive. When the output of amplifier 36 reaches $+5\pm0.5$ volts, the diode 37 goes into zener breakdown and limits the output of circuit 17 to +5 volts. A positive signal applied through resistor 38 to the inverting input of amplifier 36 drive the output of amplifier 36 in a negative direction. When the output of amplifier 36 tries to go negative, diode 37 conducts, forming a feedback path which holds the output of amplifier 36 at about zero volts. The output of circuit 17 is then zero volts.

As indicated above, the circuit of this invention is suitable for use in systems where the integral of a very slowly varying input signal is desired. Prior art devices have not served well in those circuits where the input voltage to be integrated is maintained relatively constant for long periods of time. The circuit of this invention may use a multivibrator in conjunction with a counter to count down the output of the multivibrator 18 even though the frequency of that output is already low. In this manner, a very low frequency signal is applied to the counter 25. This greatly reduces the counting rate of the counter 25 to limit the operation of the circuit to the capacity of the counter. In addition, although the counter 25 is shown in the drawing to have a capacity of eight counts, larger or smaller counters may be used to meet the requirements of the particular application.

The above specification has described a new and improved integrating circuit for use in those applications where the input signals does not vary for long periods of time. It is realized that this description will indicate to others skilled in the art additional ways in which the principles of this invention can be used without departing from its spirit. It is, therefore, intended that this invention be limited by the scope of the appended claims.

What is claimed is:

1. A long time period integrator comprising a first input amplifier, a magnitude circuit comprising a second operational amplifier having a resistive feedback path, means for connecting the output of said first amplifier to a first input of said second amplifier, means for connecting the second input of said second operational amplifier to a fixed positive voltage and for maintaining said first input positive, a multivibrator having a bias input connected to the output of said second amplifier, a third operational amplifier having a feedback path containing a first zener diode, means for connecting a first input to said third amplifier to the output of said first amplifier, means for connecting a second input to said third amplifier to ground, a second zener diode connected between the output of said third amplifier and ground, a counter having a plurality of parallel outputs the energization of which designate in combination the value of the contents of said counter, a first counter input for receiving input pulses which said counter counts in a first direction, a second counter input for receiving pulses which said counter counts in a second direction, a first and a second coincidence gate, means for connecting the output of said multivibrator to one input of each of said first and second gates, means for connecting the other input to said first gate directly to the output of said third amplifier, an inverter, means for connecting the input of said inverter to the output of said third amplifier, means for connecting the output of said inverter to the other input of said second gate, means for connecting the output of said first gate to said first counter input, means for connecting the output of said second gate to said second counter input, means connected to the plurality of outputs of said counter for converting the digital output of said counter to a voltage which represents by its amplitude the value of the contents of said counter at any moment, and a fourth operational amplifier having an integrating feedback path and being connected to the output of said conversion means.

2. The integrator defined in claim 1 wherein said counter comprises a reversible counter which can count selectively upwardly and downwardly.

* * * * *